(12) United States Patent
Stephens et al.

(10) Patent No.: US 11,375,458 B2
(45) Date of Patent: Jun. 28, 2022

(54) METHOD AND DEVICE FOR ALTITUDE-BASED INTERFERENCE MITIGATION

(71) Applicant: MOTOROLA SOLUTIONS, INC., Chicago, IL (US)

(72) Inventors: Elizabeth M. Stephens, Pembroke Pine, FL (US); Kenneth E. Luippold, Davie, FL (US); Christopher J. Falvai, Pompano Beach, FL (US); Richard L. Blanchett, Coral Springs, FL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 442 days.

(21) Appl. No.: 15/970,729

(22) Filed: May 3, 2018

(65) Prior Publication Data

US 2019/0342842 A1 Nov. 7, 2019

(51) Int. Cl.
| | |
|---|---|
| *H04W 4/00* | (2018.01) |
| *H04W 16/28* | (2009.01) |
| *H04W 52/28* | (2009.01) |
| *H04W 24/02* | (2009.01) |
| *H04W 52/38* | (2009.01) |
| *H04W 52/52* | (2009.01) |
| *H04B 7/185* | (2006.01) |

(52) U.S. Cl.
CPC ......... *H04W 52/283* (2013.01); *H04W 24/02* (2013.01); *H04W 52/38* (2013.01); *H04W 52/52* (2013.01); *H04B 7/18506* (2013.01)

(58) Field of Classification Search
None
See application file for complete search history.

(56) References Cited

U.S. PATENT DOCUMENTS

| | | | |
|---|---|---|---|
| 6,980,824 B2* | 12/2005 | Hsu ...................... | H04W 52/20 375/358 |
| 8,738,064 B2 | 5/2014 | Hofmann et al. | |
| 9,419,746 B1* | 8/2016 | Baeckler ............... | H04L 1/0001 |
| 9,918,235 B2* | 3/2018 | Brennan ............... | H04W 16/28 |
| 2004/0127171 A1* | 7/2004 | Alazraki ................. | H03J 7/04 455/87 |
| 2008/0293407 A1* | 11/2008 | Cormier ................ | H04W 60/00 455/433 |
| 2015/0327088 A1 | 11/2015 | Makhlouf et al. | |

FOREIGN PATENT DOCUMENTS

| | | |
|---|---|---|
| EP | 1376897 | 1/2004 |
| EP | 1379013 | 1/2004 |

OTHER PUBLICATIONS

ETSI TR 102 300-6V1.1.1 (2011-2012) Technical Report, Terrestrial Trunked Radio (TETRA); Voice plus Data (V+D) Designers' guide; Part 6: Air-Ground-Air, pp. 1-44.

* cited by examiner

*Primary Examiner* — Gary Lafontant
(74) *Attorney, Agent, or Firm* — Michael Best & Friedrich LLP (57) ABSTRACT

A device and method for altitude-based interference mitigation in an aerial vehicle. The device includes a transceiver, an altimeter, and an electronic processor coupled to the transceiver and the altimeter. The electronic processor is configured to determine, via the altimeter, an altitude level of the aerial vehicle, compare the altitude level to an altitude threshold, and, in response to the altitude level exceeding the altitude threshold, control a radio frequency characteristic of the transceiver to mitigate signal interference based the altitude level.

16 Claims, 4 Drawing Sheets

METHOD AND DEVICE FOR ALTITUDE-BASED INTERFERENCE MITIGATION

BACKGROUND OF THE INVENTION

Public safety and other government agencies may use aerial vehicles, for example, helicopters and unmanned aerial vehicles (UAVs), in the performance of their duties. For example, an aerial vehicle equipped with infrared camera may be used to track a suspect moving on the ground or surveil an area for suspicious activity. Multiple aerial vehicles may be used in concert to provide visual coverage for a larger overall area. Camera resolution, the physical environment, and other factors may affect the altitude at which such aerial vehicles operate. The aerial vehicles may communicate captured images, telemetry and other data, voice transmissions, and the like to people and systems. Some aerial vehicles use land-mobile radio, cellular, or other terrestrial networks to wirelessly communicate. In some aerial vehicles, a manual switch operated by a pilot is used to adjust power transmission levels for wireless communications to comply with various regulations.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As noted, public safety and other government agencies use helicopters, unmanned aerial vehicles, and other aerial vehicles in the performance of their duties. Such vehicles may be equipped with cameras and other sensors for detecting and tracking people and objects on the ground. For example, infrared cameras may be used to detect and track people and objects in low-light conditions based on heat signatures. Certain devices may be more effectively used at higher altitudes than previously was typical of aerial vehicles. For example, higher resolution infrared cameras may be designed to operate at an altitude of 2500 feet whereas other devices may have a typical operating elevation of 600 feet.

The aerial vehicles may communicate captured images, telemetry and other data, voice transmissions, and the like to others via wireless communication networks and systems. Some aerial vehicles use land-mobile radio, cellular, or other terrestrial networks to wirelessly communicate. Wireless communication through ground sites is affected by physical obstructions (for example, vegetation, human-made structures, and geographic features) located in the line-of-site between the aerial vehicle antenna and the ground site antenna. An obstructed line-of-sight may completely block or reduce the quality or strength of radiofrequency signals. Likewise, an unobstructed line-of-sight provides for an improved reception of radiofrequency signals in that transmitted signals are subject to less interference during transit.

When an aerial vehicle is operating at lower altitudes, the lines-of-sight between it and various ground sites tend to be more obstructed. As the altitude of the aerial vehicle increases, it is more likely that the lines-of-sight to various ground sites are much less obstructed. As a consequence, when an aerial vehicle operates at higher altitudes, it is exposed to significantly more radiofrequency signals because it has clear line-of-sight to more ground sites than it does at lower altitudes. Increased exposure to radiofrequency signals increases levels of radiofrequency interference experienced by the aerial vehicle. Similarly, the transmissions of the aerial vehicle may interfere with ground sites other than the site with which the aerial vehicle intends to communicate. Such interference may be particularly troublesome in networks that reuse frequencies at multiple ground sites, for example, cellular networks.

Accordingly, systems and methods are provided herein for, among other things, altitude-based interference mitigation. Using embodiments presented herein, aerial communications devices adaptively employ attenuators based on their altitudes to reduce exposure to interfering sites. Additionally, the systems and methods adaptively modify transmit power levels based on altitude.

One example embodiment provides a device for altitude-based interference mitigation of an aerial vehicle. The device includes a transceiver, an altimeter, and an electronic processor coupled to the transceiver and the altimeter. The electronic processor configured to determine, via the altimeter, an altitude level of the aerial vehicle, compare the altitude level to an altitude threshold, and, in response to the altitude level exceeding the altitude threshold, control a radio frequency characteristic of the transceiver to mitigate signal interference based the altitude level.

In another example embodiment, the method further includes determining, via an altimeter, an altitude level of the aerial vehicle, comparing, by an electronic processor, the altitude level to an altitude threshold, and, in response to the altitude level exceeding the altitude threshold, controlling, via the electronic processor, a radio frequency characteristic of a transceiver of the communication device to mitigate signal interference based the altitude level.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that the term "digital signal processor" may refer to single digital signal processor, or to one or more different types of electronic processing devices, as described herein. Accordingly, as can be appreciated by one skilled in the art, the systems and methods described herein are not limited in their application to a digital signal processor, and they may be implemented using various digital and analog components, which for brevity are not described herein and which may be implemented in hardware, software, or a combination of both.

It should also be noted that although the invention is described in terms of a single base station (base station 102A) affecting communications in the system 100 that, in some embodiments, more than one base station and/or aerial communications device may be affecting the system 100.

Figure 1:
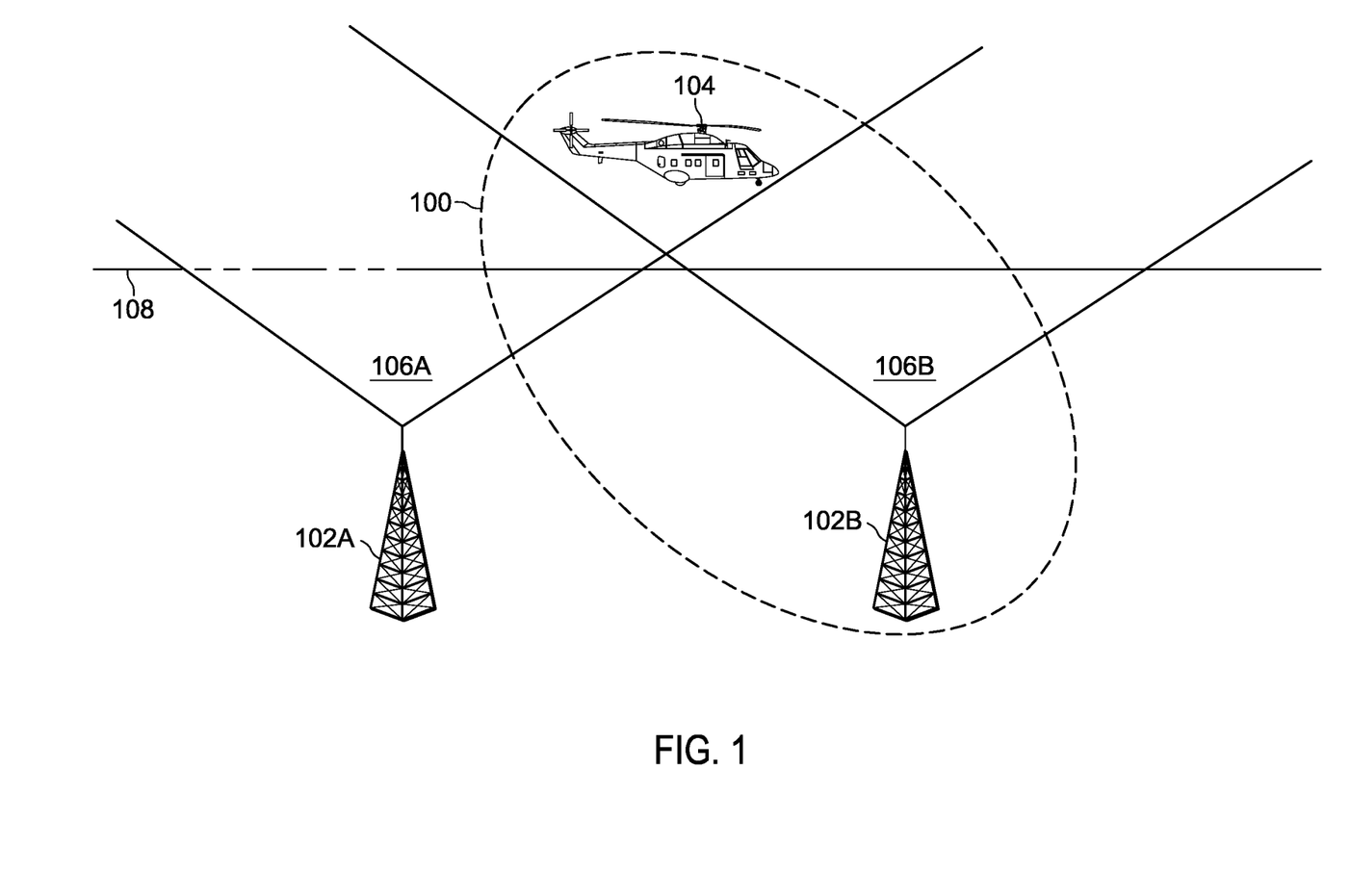
FIG. 1 is a diagram of a communications system in accordance with some embodiments.

FIG. 1 is a diagram of one exemplary embodiment of a communications system 100. In the illustrated embodiment, the communications system 100 is an aviation/aircraft radio network. For example, the communications system 100 is a public safety land mobile radio (LMR) network. In alternative embodiments, the communications system 100 may operate using other two-way radio communications protocols and standards. The communications system 100 includes base station 102B and aerial vehicle 104. Outside the communications system 100 is a second base station 102A. Base stations 102A and 102B are radio broadcasting infrastructures configured to communicate via radio frequency communication using a particular radio frequency band. The base stations 102A and 102B each are part of an aircraft communications radio network (not shown) or other network, and may be, for example, a base station including antennas, transmitters, receivers, controllers, and other equipment configured to provide wireless communications to mobile and portable two-way radios. The base stations 102A and 102B are capable of providing wireless communications over a particular coverage area (that is, within a limited distance from the equipment), illustrated as broadcast areas 106A and 106B respectively.

Figure 2:
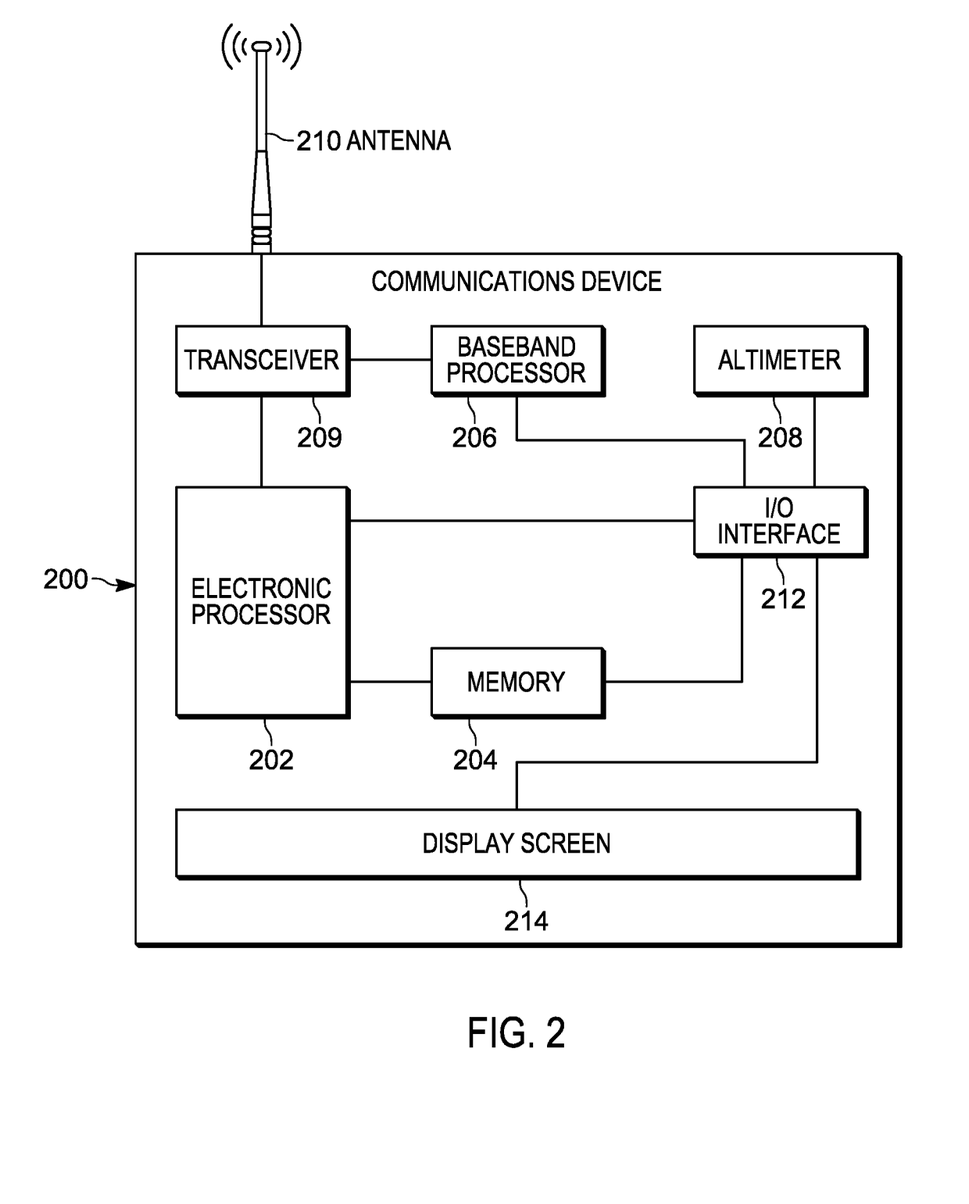
FIG. 2 is a block diagram of a communications device in accordance with some embodiments.

Aerial vehicle 104 may be any form of piloted or pilotless vehicle configured for air travel, for example, a helicopter, plane, or drone. The aerial vehicle 104 includes a radio communications device 200 (FIG. 2). As explained in more detail below, the radio communications device 200 is used by the aerial vehicle 104 (or operator of the aerial vehicle 104) to communicate with base station 102B. In some embodiments, one or both of the base stations 102A and/or 102B is mounted in a vehicle such as, for example, a police command vehicle. Accordingly, some of the equipment of the base station 102A and/or 102B can be positioned to extend the coverage area of the base station 102A and 102B to allow one or more aerial vehicles 104 (specifically, via the communication device 200 of FIG. 2) to communicate with the base station 102A and/or 102B (as well as other communications devices).

FIG. 2 is a block diagram illustrating the communications device 200 within the aerial vehicle 104. In the example illustrated, the communications device 200 includes an electronic processor 202, a memory 204, a baseband processor 206, an altimeter 208, a transceiver 209, and an antenna 210. The communications device 200 may also include an input/output (I/O) interface 212 and a display screen 214. For ease of description, the embodiment of the communications device 200 illustrated in FIG. 2 includes one of each of the foregoing components. Alternative embodiments may include more or fewer of each of these components, may combine some components, or may include other alternative components. For example, some embodiments include components that perform distinct functions. For example, in some embodiments, the transceiver 209 comprises a transmitter and a separate receiver. Other embodiments may include components, for example, a transmitter and a receiver (not shown) that operate to establish short-range wireless, Wi-Fi, or other wireless connections with other electronic devices or wireless data networks. The communications device 200 may be integrated into the aerial vehicle 104 or may be a device separate from the aerial vehicle 104.

The electronic processor 202, the memory 204, a baseband processor 206, an altimeter 208, the transceiver 209, and the antenna 210, as well as other various modules and components, are electrically coupled to each other by or through one or more control or data buses, which enable communication therebetween. The electronic processor 202 operates to control the other components of the communications device 200. The electronic processor 202 obtains and provides information (for example, from the memory 204 and/or the input/output interface 212), and processes the information by executing one or more software instructions or modules, capable of being stored, for example, in a random access memory ("RAM") area of the memory 204 (for example, during execution) or a read only memory ("ROM") of the memory 204 (for example, on a generally permanent basis) or another non-transitory computer readable medium. The software can include firmware, one or more applications, program data, filters, rules, one or more program modules, and other executable instructions. The electronic processor 202 retrieves from the memory 204 and executes, among other things, software related to the control processes and methods described herein.

The memory 204 can include one or more non-transitory computer-readable media, and includes a program storage area and a data storage area. The program storage area and the data storage area can include combinations of different types of memory, as described herein.

The input/output interface 212 operates to receive input from, for example, a user of the communications device 200, to provide system output, or a combination of both. The input/output interface 212 obtains information and signals from, and provides information and signals to, (for example, over one or more wired and/or wireless connections) devices both internal and external to the communications device 200. Input may be provided via, for example, a keypad, a microphone, soft keys, icons, or soft buttons on the display screen 214, a scroll ball, buttons, and the like. System output may be provided via the display screen 214. The display screen 214 is a suitable display device such as, for example, a liquid crystal display (LCD) touch screen, or an organic light-emitting diode (OLED) touch screen. The input/output interface 212 may include a graphical user interface (GUI) (for example, generated by the electronic processor 202, from instructions and data stored in the memory 204, and presented on the display screen 214) that enables a user to interact with the communications device 200. In alternative embodiments, the input/output interface 212 includes a push-to-talk (PTT) button for activating a two-way radio modem (not shown), which button may be implemented, for example, as a physical switch or by using a soft key or icon in the graphical user interface on the display screen 214.

The baseband processor 206 operates to encode and decode digital data sent and received by the transceiver 209. The electronic processor 202 controls the transceiver 209 to send and receive data to and from various wireless communications and data networks such as, for example, a long-term evolution cellular network (not shown), via the antenna 210.

The altimeter 208 is configured to determine a position (specifically, an altitude level) of the aerial vehicle 104 relative to the earth's surface. The altimeter 208 may be, for example, a barometric or radar altitude meter. In some embodiments, the altimeter 208 is located outside the communications device 200 and/or the aerial vehicle 104. Alternatively, in some embodiments, the altimeter 208 may be a combination of hardware and software configured to determine the altitude level of the aerial vehicle 104 using information received from another sensor and/or communication device, (for example, by utilizing a global positioning system (GPS) or radar or via information received via the antenna 210 and transceiver 209).

In one exemplary embodiment, the communications device 200 is configured to perform a variety of functions, accessible via components including the input/output interface 212 and the display screen 214. The functions include, for example, running local or network-based applications ("apps"), providing access to remote data networks (for example, using the long-term evolution (LTE) protocol), and providing wireless voice communications using one or more modalities (for example, land-mobile or cellular).

As the communications device 200 within the aerial vehicle 104 progresses in altitude, the communications device 200 may be exposed to more radio frequency broadcasts due to line-of-sight visibility of an increased number of multiple ground sites. For example, returning to FIG. 1, the aerial vehicle 104 may be configured to communicate with the base station 102B via the communication device 200. However, when the aerial vehicle 104 ascends above an altitude level 108, the aerial vehicle 104 is now positioned within both broadcast areas 106A and 106B. This may result in the signals broadcasted by the station 102A and signals transmitted by one or more communication devices (not shown) within the communication network station 102A to interfere with the transmission and reception of signals by the communication device 200 within the aerial vehicle 104 and by the station 102B. For example, the interference may include one or more of signal overlapping, intermodulation interference, out of band emissions, radiofrequency saturation, crosstalk, and the like. When the radiofrequency interference is severe enough, the communications device 200 within the aerial vehicle 104 may not be able to connect to, or communicate with, its affiliated radio network (in the illustrated example, station 102B). Accordingly, using the methods described below, the communications device 200 operates to detect the potential for radiofrequency interference based on altitude level and attempt to mitigate the interference.

Figure 3:
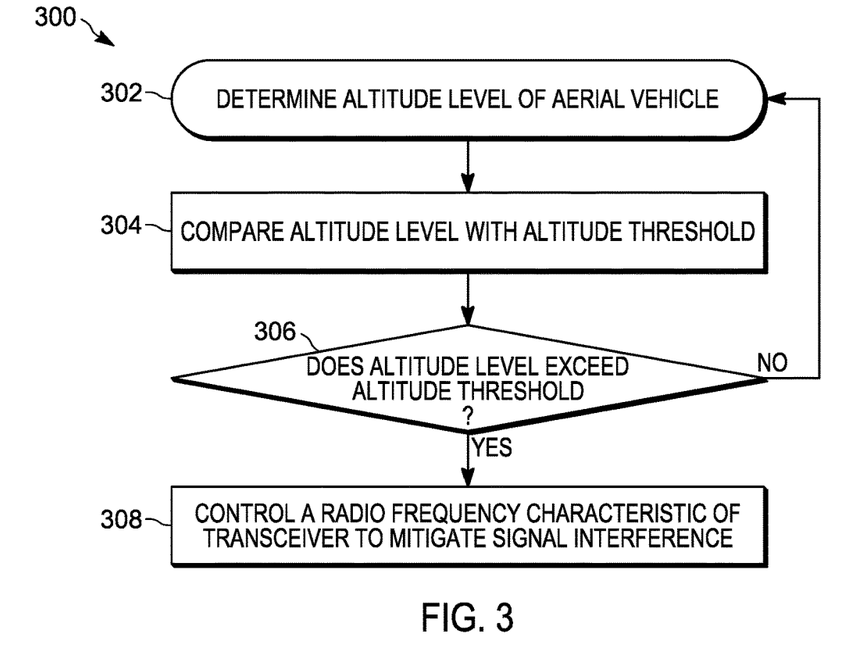
FIG. 3 is a flowchart of a method for mitigating altitude-based interference in accordance with some embodiments.

FIG. 3 illustrates an example method 300 for altitude-based interference mitigation of a communication device of an aerial vehicle. As an example, the method 300 is described in terms of the communications device 200 (specifically the electronic processor 202) being used by aerial vehicle 104 (or an operator of aerial vehicle 104) in the situation illustrated in FIG. 1 as described above. This should not be considered limiting; the concepts embodied in the example described may be applied to different scenarios, combinations of devices, and devices that operate according to different protocols or modalities than those explicitly explained.

At block 302, the electronic processor 202 determines an altitude level of the aerial vehicle 104. The altitude level is determined, for example, based on a reading from the altimeter 208. In other words, the altimeter 208 generates a measurement indicative of its altitude and provides a signal to the electronic processor 202 indicative of the measured/determined altitude.

At block 304, the electronic processor 202 compares the altitude level to an altitude threshold. The altitude threshold may be a predetermined or default stored value. In further embodiments, the altitude threshold may be defined by a user of the communications device 200 via, for example, the graphical user interface on the display screen 214. The altitude threshold is, for example, approximately 2500 feet. It should be understood that, in further embodiments, the altitude threshold may be different.

When the altitude level exceeds the altitude threshold (block 306), the electronic processor 202 controls a radio frequency characteristic of the transceiver 209 to mitigate signal interference based the altitude level. As described in more detail below in regard to FIGS. 4 and 5, the radio frequency characteristic may be one or more of a transmission and/or receiving power gain of the transceiver 209, site roaming, and a frequency offset from the center frequency that the transceiver 209 was originally tuned to. The transmission and receiving power gain of the transceiver 209 for transmitting signals and receiving signals respectively. The gain may be attenuated, for example, via a radio frequency attenuator circuit or amplified via a radio frequency amplifier. In some embodiments, the electronic processor 202 is further configured to determine, via the altimeter, a second altitude level, compare the second altitude level to an altitude threshold, and in response to the second altitude level being below the altitude threshold, reverse the control of the radio frequency characteristic. In other words, when the aerial vehicle 104 is determined to be below the altitude threshold, the electronic processor 202 stops performing one or more of the control methods described below.

Figure 4:
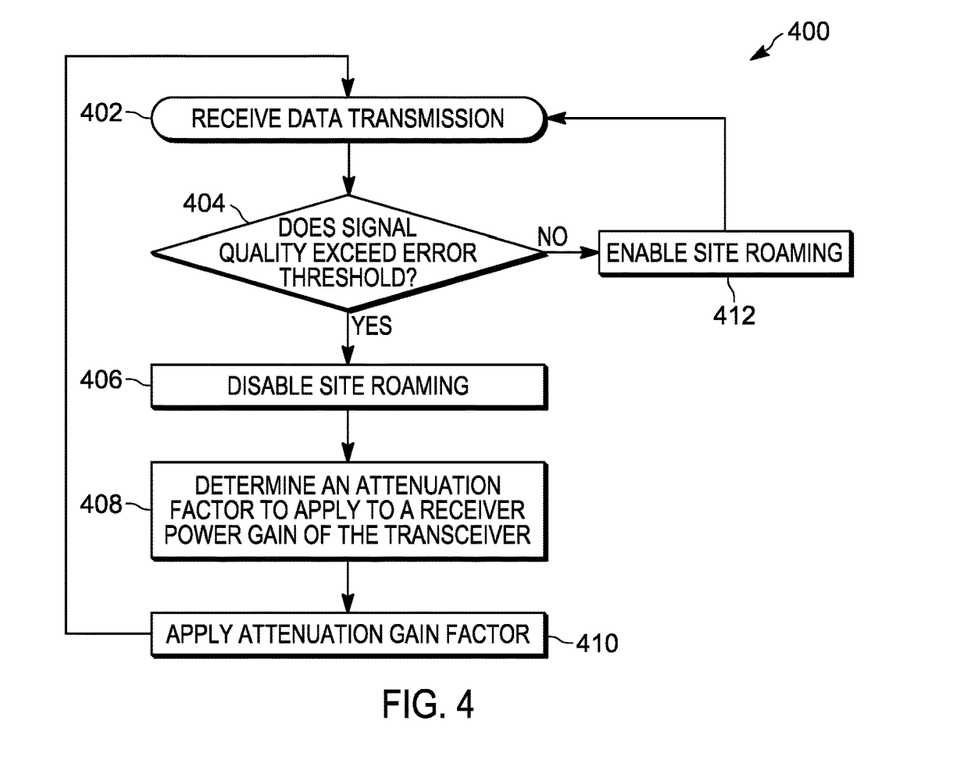
FIG. 4 is a flowchart of a method for mitigating altitude-based interference in accordance with some embodiments.

FIG. 4 illustrates an exemplary method 400 for altitude-based interference mitigation of a communication device of an aerial vehicle. As an example, the method 400 is described in terms of a communications device 200 (specifically electronic processor 202) within the aerial vehicle 104. Exemplary embodiments of the communications device 200 may implement one or more of the methods described herein. Some or all of the method 400 may be performed in addition to or as part of the method 300. For example, the method 400 may be performed at block 306, wherein the modified radio frequency characteristic is applied to data received by the communication device 102. In some embodiments, the method 400 is performed so long as the altitude level of the aerial vehicle 104 exceeds the altitude threshold.

At block 402, the electronic processor 202 receives, via the transceiver 209 (and antenna 210), a data transmission. The data transmission is received from, for example, the station 102B. At block 404, the electronic processor 202 determines if a signal quality of the data transmission exceeds an error threshold. The signal quality of the data transmission is determined by the electronic processor 202 based on one or more of a bit error rate (BER), a cyclic redundancy check (CRC), a channel content mismatch, and other signal quality measurements. Each signal quality measurement performed at block 404 may correspond to a separate error threshold. For example, the error threshold for BER may be 4% while the error threshold for CRC may be 20%. In some embodiments, the error threshold depends on the type of data transmission (for example, audio versus data).

In some embodiments, the communication device 200 may be a trunked two-way radio system. In such embodiments, when the electronic processor 202 determines that the signal quality of the data transmission exceeds the error threshold, the electronic processor 202 disables site roaming of the communication device at block 406 before proceeding with the method 400. When the communication device 200 is a non-trunked two-way system, block 406, as well as block 412, are not performed.

At block 408, the electronic processor 202 determines an attenuation factor to apply to a receiver power gain of the transceiver 209. In some embodiments, the attenuation factor is based on the altitude level. For example, the greater the altitude level, the greater the attenuation factor. In some embodiments, the magnitude of the attenuation factor is based on the particular severity of the error rate (for example, based on the difference between the determined error rate and the error threshold). For example, the more the determined error rate exceeds the error threshold, the greater the attenuation factor. In some embodiments, the magnitude of the attenuation factor is based on the resulting range quality of the transceiver 209. In other words, the electronic processor 202 may be configured to determine the magnitude limit of the attenuation factor (for example, a maximum attenuation factor) based on the strength of radio frequency communication between the communications device 200 and the base station 102B. The magnitude limit is determined such that the attenuation factor is not so large that it compromises the communication between the communications device 200 and the base station 102B. In such embodiments, the electronic processor 202 may be configured to apply the maximum attenuation factor when it is determined that there is a channel content mismatch.

The electronic processor 202 then applies the attenuation factor to the power gain of the transceiver 209 at block 410, transmits, via the transceiver 209, the data transmission, and the method 400 is repeated starting again at block 402. In other words, the electronic processor 202 continues to adjust the receiver power gain of the transceiver 209 until the signal quality of the received data transmissions improve. In some embodiments, the attenuation factor is determined in incremental steps based on one or more previously applied attenuation factors. The method 400 is repeated until the signal quality no longer exceeds the error threshold (block 404). In embodiments where the communications device 200 is a trunked radio, when the electronic processor 202 determines that the signal quality no longer exceeds the error threshold, the electronic processor 202 enables (when currently disabled) site roaming (block 412).

Figure 5:
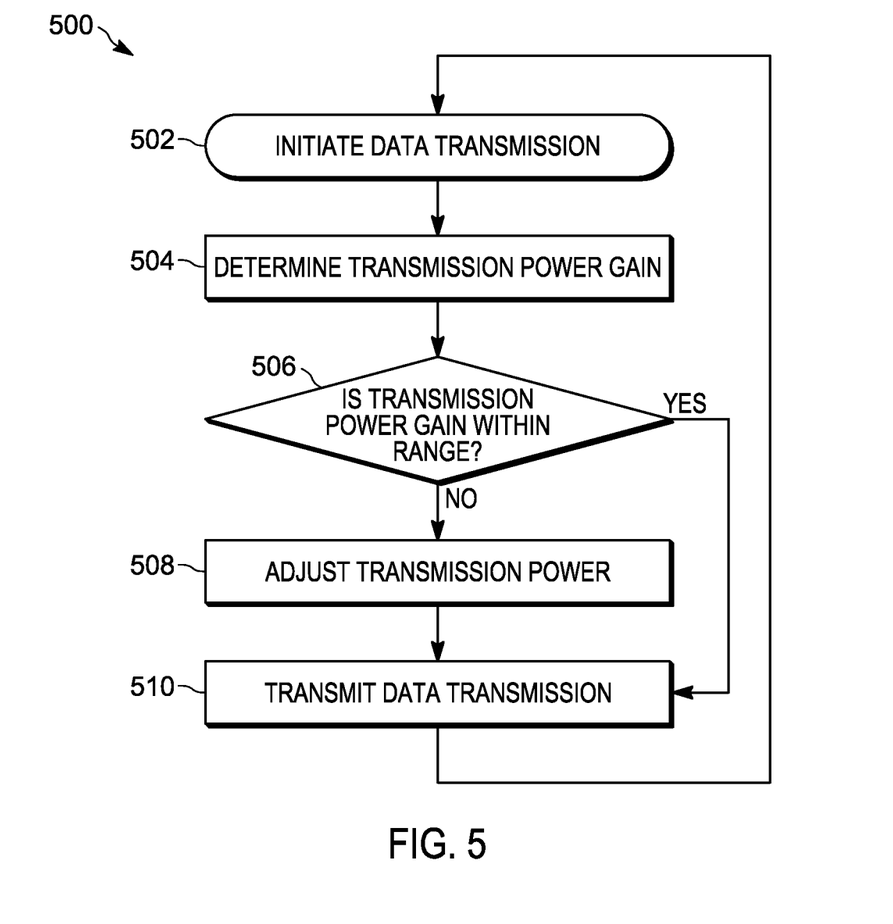
FIG. 5 is a flowchart of a method for mitigating altitude-based interference in accordance with some embodiments.

In some embodiments, when the electronic processor 202 determines that the signal quality of the data transmission exceeds the error threshold (or thresholds), the electronic processor 202 is further be configured to automatically tune the transceiver 209 to a frequency offset from the center frequency to which the transceiver 209 was originally tuned. The electronic processor 202 may (optionally) perform this step before or in addition to blocks 408 and 410 when the signal quality of the received data transmission is not improved in response to adjusting the receiver power gain of the transceiver 209 and/or (when performing the method 500 below) adjusting the transmission power gain of the transceiver 209. In some embodiments, the electronic processor 202 automatically tunes the transceiver 209 to a frequency offset when the maximum attenuation factor has been applied and the signal quality has not improved/no longer exceeds the error threshold. The electronic processor 202 may tune the transceiver 209 by offsetting the transceiver 209 to a frequency on a first side of the center frequency and evaluate the signal quality of the received signal as described at block 404 of the method 400. In response to the signal quality exceeding the error threshold, the electronic processor 202 may offset the transceiver to a second frequency on a second (opposite) side of the center frequency and evaluate the signal quality of the received signal as described at block 404 of the method 400 again. The electronic processor 202 may continue tuning the transceiver 209 and evaluating the signal quality until the signal quality no longer exceeds the error threshold. The electronic processor 202 may keep the transceiver 209 tuned at the current frequency offset until the signal quality of a subsequent data transmission exceeds the error threshold, a receive signal strength indicator (RSSI) level of a subsequent data transmission fails to exceed an RSSI threshold, the communication device 200 switches to a second site (when the communication device 200 is a trunked system), and/or when the altitude level no longer exceeds the altitude threshold.

When the electronic processor 202 determines an attenuation factor that improves the signal quality of the data transmission enough that the signal quality no longer exceeds the error threshold, the attenuation factor remains applied to the transceiver 209 until a signal quality of a subsequent data transmission exceeds the error threshold, a receive signal strength indicator (RSSI) level of a subsequent data transmission fails to exceed an RSSI threshold, the communication device 200 switches to a second site (when the communication device 200 is a trunked system), and/or when the altitude level no longer exceeds the altitude threshold.

In some embodiments, the mitigation techniques of steps 406, 408, and 410 are performed in a different order than shown. Additionally, in some embodiments, after each mitigation technique (e.g., block 406), the signal quality is checked again (in block 404) before performing a further mitigation technique (e.g., block 410).

FIG. 5 illustrates an example method 500 for altitude-based interference mitigation of a communication device of an aerial vehicle. As an example, the method 500 is described in terms of a communications device 200 (specifically electronic processor 202) within the aerial vehicle 104. Example embodiments of the communications device 200 may implement one or more of the methods described herein. Some or all of the method 500 may be performed in addition to/as part of the method 300. For example, the method 500 may be performed at block 306, wherein the modified radio frequency characteristic is applied to data to be transmitted by the communication device 102. Some or all of the method 500 may be performed in addition to the method 400. Similar to the method 400, in some embodiments the method 500 is performed so long as the altitude level of the aerial vehicle 104 exceeds the altitude threshold.

At block 502, the electronic processor 202 initiates a data transmission to be transmitted to the base station 102B. The data transmission may be audio, data, or both. At block 504, the electronic processor 202 determines a transmission power gain range based on the altitude level of the aerial vehicle 104. In some embodiments, to determine the transmission power gain range, the electronic processor 202 uses the altitude level as an input to a formula or lookup table mapping altitude levels to associated transmission power gain ranges. In some embodiments, the higher the altitude level, the lower the transmission power gain range. The transmission power gain range may be a default range or a user-defined/custom range. At block 506, determines if the transmission power gain of the transceiver 209 is within the transmission power gain range. When the transmission power gain of the transceiver 209 is not within the transmission power gain range, the electronic processor 202 adjusts the transmission power gain to a second transmission power gain wherein the second transmission power gain is within the transmission power gain range. For example, the second transmission power gain may be lower than the initial transmission power gain, effectively reducing the coverage area of the transmission from the transceiver 209. This adjustment may prevent interaction with receivers outside the system 100 that may be communicating on a radio frequency band that overlaps with the radio frequency band of the network/system 100 (for example, station 102A of FIG. 1). The electronic processor 202 then transmits the data transmission via the transceiver 209 at the second transmission power gain (block 510). When the initial transmission power gain is within the transmission power gain range, the electronic processor 202 transmits the data transmission at the initial power gain in block 510. In some embodiments, blocks 504 and 506 are bypassed and, in block 508, the transmission power gain is set based on the altitude level using a formula or a lookup table that maps altitude levels to associated transmission power gains.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device for altitude-based interference mitigation of an aerial vehicle, the device comprising:
   a transceiver;
   an altimeter; and
   an electronic processor coupled to the transceiver and the altimeter, the electronic processor configured to
      determine, via the altimeter, an altitude level of the aerial vehicle,
      compare the altitude level to an altitude threshold, and
      in response to the altitude level exceeding the altitude threshold, control a radio frequency characteristic of the transceiver to mitigate signal interference of a data transmission based on the altitude level by
         determining whether a signal quality of the data transmission exceeds an error threshold,
         determining an attenuation factor when the signal quality of the data transmission exceeds the error threshold,
         applying the attenuation factor to a receiver gain of the device, reducing the receiver gain, while the signal quality of the data transmission exceeds the error threshold, incrementally increasing the attenuation factor until the signal quality no longer exceeds the error threshold or until a maximum attenuation factor is applied, and tuning, when the signal quality continues to exceed the error threshold after the maximum attenuation factor is applied, the transceiver to a frequency offset from a center frequency to which the transceiver was originally tuned, wherein the attenuation factor is a magnitude, and wherein the maximum attenuation factor is based on a strength of radio frequency communication between the device and a radio base station.

2. The device of claim 1, wherein the electronic processor determines the attenuation factor based on at least one selected from the group consisting of an error rate, the altitude level, and a range quality of a resulting signal.

3. The device of claim 1, wherein the electronic processor is further configured to disable site roaming while the attenuation factor is being determined.

4. The device of claim 1, wherein the error threshold is determined based on at least one selected from the group consisting of a bit error rate threshold, a cyclic redundancy check threshold, and a channel content mismatch.

5. The device of claim 1, wherein controlling the radio frequency characteristic further includes determining a transmission power range based on the altitude level;

determining whether a transmission power gain of the transceiver is within the power range;

adjusting, in response to the transmission power gain being outside the power range, the transmission power gain to a second transmission power gain, wherein the second power gain is within a predetermined power range; and transmitting a data transmission from the transceiver at the second transmission power gain.

6. The device of claim 1, wherein the electronic processor is further configured to affect the radio frequency characteristic of the transceiver to mitigate signal interference based on the altitude level until at least one condition is met, the at least one condition selected from the group consisting of a signal quality of a second data transmission received exceeds an error threshold;

a received signal strength indicator level of the second data transmission fails to exceed a received signal strength indicator threshold;

the device ends a first communication link with a first site and establishes a second communication link with a second site; and the altitude level no longer exceeds the altitude threshold.

7. The device of claim 1, wherein controlling the radio frequency characteristic further includes adjusting a transmission power gain of the transceiver.

8. The device of claim 1, wherein the electronic processor is further configured to determine, via the altimeter, a second altitude level, compare the second altitude level to an altitude threshold, and in response to the second altitude level being below the altitude threshold, reverse the control of the radio frequency characteristic.

9. A method for altitude-based interference mitigation of a communication device of an aerial vehicle, the method comprising:

determining, by an altimeter, an altitude level of the aerial vehicle;

comparing, by an electronic processor, the altitude level to an altitude threshold; and in response to the altitude level exceeding the altitude threshold, controlling, by the electronic processor, a radio frequency characteristic of a transceiver of the communication device to mitigate signal interference of a data transmission based on the altitude level by determining, whether a signal quality of the data transmission exceeds an error threshold, determining an attenuation factor when the signal quality of the data transmission exceeds the error threshold, applying the attenuation factor to a receiver gain of the device, reducing the receiver gain, while the signal quality of the data transmission exceeds the error threshold, incrementally increasing the attenuation factor until the signal quality no longer exceeds the error threshold or until a maximum attenuation factor is applied, and tuning, when the signal quality continues to exceed the error threshold after the maximum attenuation factor is applied, the transceiver to a frequency offset from a center frequency to which the transceiver was originally tuned, wherein the attenuation factor is a magnitude, and wherein the maximum attenuation factor is based on a strength of radio frequency communication between the device and a radio base station.

10. The method of claim 9, wherein the attenuation factor is determined based on at least one selected from the group consisting of an error rate, the altitude level, a range quality of a resulting signal.

11. The method of claim 9, the method further comprising disabling, via the electronic processor, site roaming while the attenuation factor is being determined.

12. The method of claim 9, wherein the error threshold is determined based on at least one selected from the group consisting of a bit error rate threshold, a cyclic redundancy check threshold, and a channel content mismatch.

13. The method of claim 9, wherein controlling the radio frequency characteristic further includes determining a transmission power gain range based on the altitude level;

determining whether a transmission power gain of the transceiver is within the power range;

adjusting, in response to the transmission power gain being outside the power range, the transmission power gain to a second transmission power gain, wherein the second power gain is within a predetermined power range; and transmitting a data transmission from the transceiver at the second transmission power gain.

14. The method of claim 9, wherein affecting the radio frequency characteristic of the transceiver to mitigate signal interference based the altitude level until at least one condition is met, the at least one condition selected from the group consisting of a signal quality of a second data transmission received exceeds an error threshold;

a received signal strength indicator level of the second data transmission fails to exceed a received signal strength indicator threshold;

the communication device ends a first communication link with a first site and establishes a second communication link with a second site; and the altitude level no longer exceeds the altitude threshold.

15. The method of claim 9, wherein controlling the radio frequency characteristic further includes adjusting a transmission power gain of the transceiver.

16. The method of claim 9, wherein the method further includes
  determining, via the altimeter, a second altitude level,
  comparing, via the electronic processor, the second altitude level to an altitude threshold, and
in response to the second altitude level being below the altitude threshold, reversing, via the electronic processor, the control of the radio frequency characteristic.

\* \* \* \* \*